United States Patent
Taherzadeh Boroujeni et al.

(10) Patent No.: US 12,212,992 B2
(45) Date of Patent: Jan. 28, 2025

(54) REPORTING OF SPATIAL VARIATIONS IN INTERFERENCE

(71) Applicant: QUALCOMM Incorporated, San Diego, CA (US)

(72) Inventors: Mahmoud Taherzadeh Boroujeni, San Diego, CA (US); Arumugam Chendamarai Kannan, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/077,524

(22) Filed: Oct. 22, 2020

(65) Prior Publication Data
US 2021/0153053 A1     May 20, 2021

Related U.S. Application Data

(60) Provisional application No. 62/938,177, filed on Nov. 20, 2019.

(51) Int. Cl.
| | |
|---|---|
| *H04W 24/10* | (2009.01) |
| *H04B 7/06* | (2006.01) |
| *H04B 17/318* | (2015.01) |
| *H04B 17/336* | (2015.01) |
| *H04L 1/00* | (2006.01) |

(Continued)

(52) U.S. Cl.
CPC .......... *H04W 24/10* (2013.01); *H04B 7/0626* (2013.01); *H04B 7/0632* (2013.01); *H04B 17/318* (2015.01); *H04B 17/336* (2015.01); *H04L 1/0003* (2013.01); *H04W 72/23* (2023.01); *H04W 76/27* (2018.02); *H04W 80/02* (2013.01)

(58) Field of Classification Search
CPC ... H04W 24/10; H04W 76/27; H04W 72/042; H04W 80/02; H04B 17/318; H04B 17/36; H04B 7/0626; H04B 7/0632; H04L 1/0003
See application file for complete search history.

(56) References Cited

U.S. PATENT DOCUMENTS

| | | | |
|---|---|---|---|
| 2003/0002450 A1 | 1/2003 | Jalali et al. | |
| 2008/0229177 A1* | 9/2008 | Kotecha | H04L 43/00 714/776 |

(Continued)

OTHER PUBLICATIONS

International Search Report and Written Opinion—PCT/US2020/057036—ISA/EPO—Jan. 28, 2021.

*Primary Examiner* — Joseph A Bednash
(74) *Attorney, Agent, or Firm* — Harrity & Harrity, LLP

(57) ABSTRACT

An interference metric measured at a specific antenna may differ from interference metrics at different antennas. As a result, any actions based on the interference metric may unduly be influenced by such difference. In some implementations, an apparatus or device reports an overall interference metric that accounts for spatial variations in interference metrics at different antennas. An example method includes measuring, by a user equipment, an interference metric at each antenna of two or more antennas for wireless signals transmitted by a base station, generating an overall interference metric based on the interference metrics for the two or more antennas, and transmitting, by the user equipment, the overall interference metric to the base station.

30 Claims, 12 Drawing Sheets

(51) Int. Cl.
*H04W 72/23* (2023.01)
*H04W 76/27* (2018.01)
*H04W 80/02* (2009.01)

(56) References Cited

U.S. PATENT DOCUMENTS

| | | | |
|---|---|---|---|
| 2009/0010319 A1* | 1/2009 | Sun | H04L 1/0029 |
| | | | 455/67.11 |
| 2009/0040998 A1* | 2/2009 | Park | H04L 1/1671 |
| | | | 370/345 |
| 2009/0232233 A1* | 9/2009 | Duan | H04L 1/0026 |
| | | | 375/260 |
| 2014/0044069 A1* | 2/2014 | Bao | H04B 7/0689 |
| | | | 370/329 |
| 2015/0065034 A1* | 3/2015 | Lenive | H04B 7/10 |
| | | | 455/39 |
| 2015/0341897 A1* | 11/2015 | Zhu | H04W 68/005 |
| | | | 370/329 |
| 2015/0347282 A1* | 12/2015 | Wingfors | G06F 11/3664 |
| | | | 717/124 |
| 2016/0020865 A1 | 1/2016 | Byoung-Hoon et al. | |
| 2016/0150567 A1 | 5/2016 | Baker et al. | |
| 2016/0226709 A1* | 8/2016 | Chen | H04B 17/318 |
| 2017/0034709 A1* | 2/2017 | Hapsari | H04W 24/00 |
| 2018/0098234 A1* | 4/2018 | Kim | H04B 7/065 |
| 2019/0373614 A1* | 12/2019 | Yum | H04W 72/53 |
| 2020/0228213 A1* | 7/2020 | Masal | H04L 5/14 |
| 2021/0410160 A1* | 12/2021 | Guo | H04W 72/21 |
| 2022/0006501 A1* | 1/2022 | Kim | H04W 24/10 |

* cited by examiner

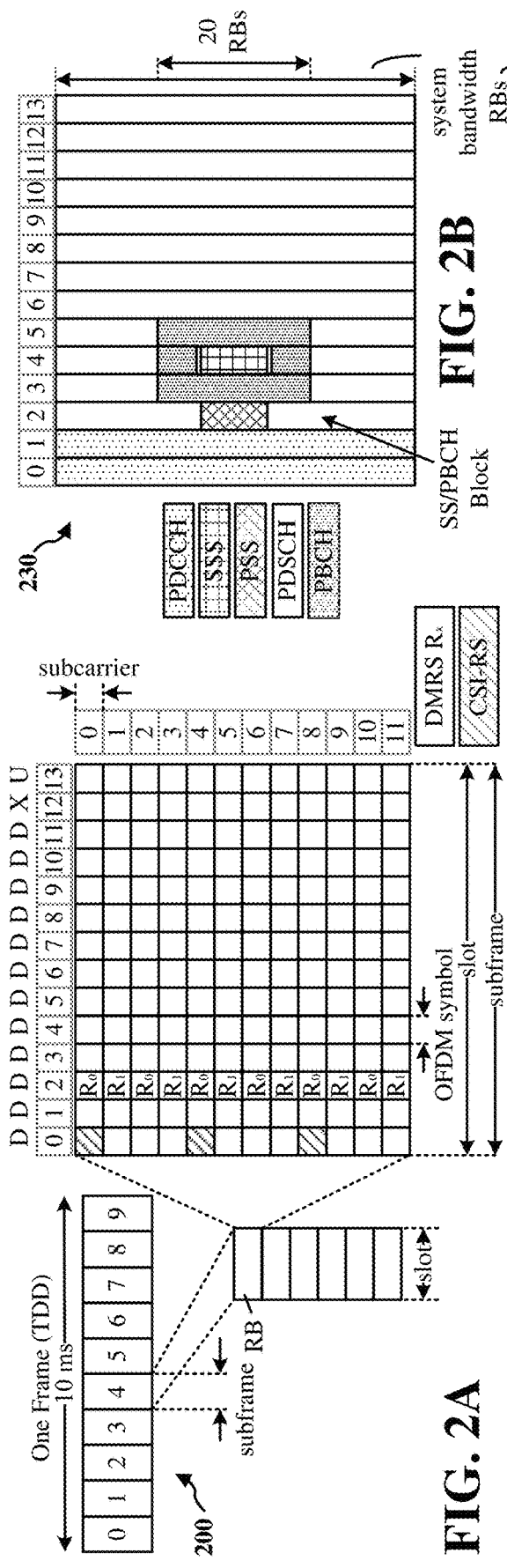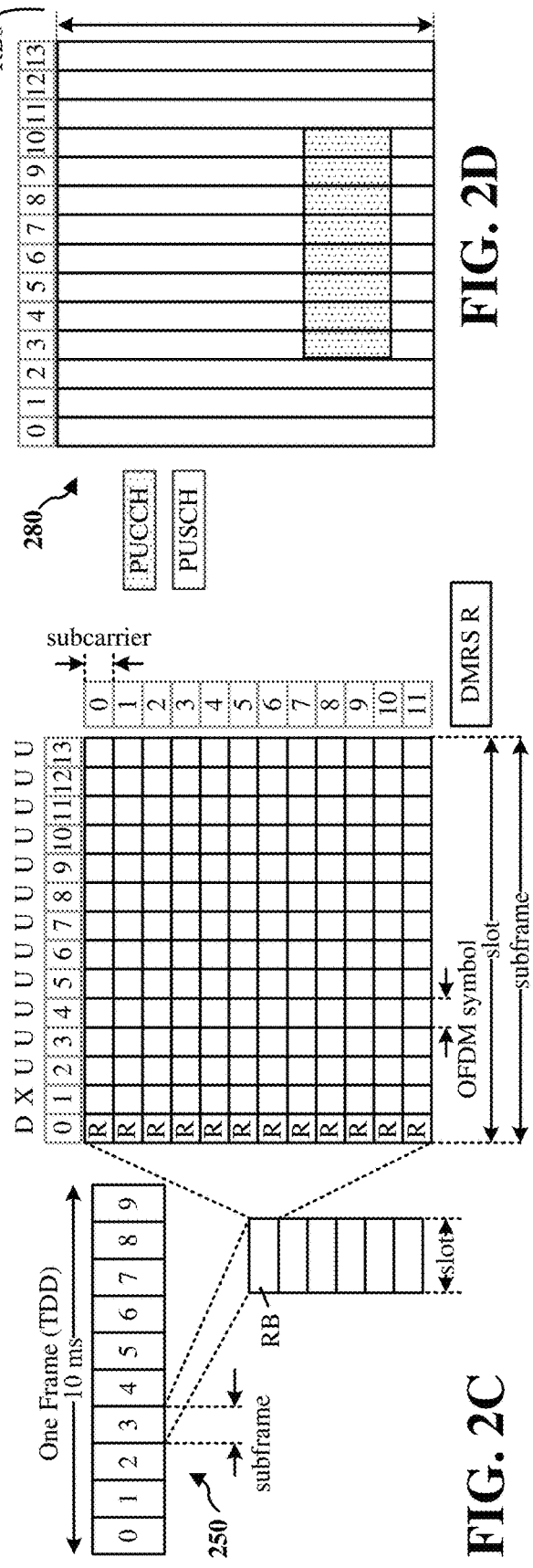

REPORTING OF SPATIAL VARIATIONS IN INTERFERENCE

CROSS-REFERENCE TO RELATED APPLICATIONS

This patent application claims priority to U.S. Provisional Patent Application No. 62/938,177 entitled "REPORTING OF SPATIAL VARIATIONS IN INTERFERENCE" and filed on Nov. 20, 2019, which is assigned to the assignee hereof and incorporated by reference in this patent application.

TECHNICAL FIELD

The present disclosure relates generally to communication systems, and more particularly, to reporting of spatial variations in interference for wireless transmissions.

DESCRIPTION OF THE RELATED TECHNOLOGY

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Interference at a device is typically measured at a specific antenna of the device. For example, the device may measure a signal to interference plus noise ratio (SINR) at one antenna, and the device may report the SINR to the other device. However, interference may be affected at different antennas. For example, beamforming may cause interference to be higher at one antenna as compared to another antenna of the device. As a result, any decisions or actions based on an interference measurement at a single antenna may be unduly impacted.

In some implementations, a device may determine an overall interference across multiple antennas. For example, a user equipment measures, at different antennas, an interference (such as the SINR) for wireless signals transmitted by a base station to the user equipment. The user equipment then determines an overall interference metric based on the measured interferences. For example, the user equipment may determine an average, a median, a variance, a standard deviation, a distribution, a difference, or other suitable metric based on the measured interferences at the antennas. The user equipment then transmits the overall interference metric to the base station. In some implementations, the base station determines a modulation and coding scheme and/or schedules transmissions based on the overall interference metric.

In some aspects of the disclosure, a method, an apparatus, and a computer-readable medium are provided. An example method includes measuring, by a first device, an interference metric at each antenna of two or more antennas of the first device for wireless signals transmitted by a second device, generating an overall interference metric based on the interference metrics for the two or more antennas, and transmitting, by the first device, the overall interference metric to the second device. In some implementations, the first device is a user equipment (UE), and the second device is a base station. The base station may be a next generation node B (gNB).

Each interference metric may include one or more of: a channel quality indicator (CQI); a signal to interference plus noise ratio (SINR); a signal to noise ratio (SNR); or instantaneous channel state information (CSI). In some implementations, generating the overall interference metric includes determining a difference between the interference metrics at each antenna of the two or more antennas. The difference may be a distance metric between the interference metrics at each antenna of the two or more antennas. In some implementations, each interference metric is measured based on one or more interference measurement resources (IMR) for the UE as defined by the Third Generation Partnership Project (3GPP) set of standards. Each interference metric may be based on a cross-link interference received signal strength indicator (CLI-RSSI) at the two or more antennas.

Measuring the interference metric at each antenna of the two or more antennas may include periodically measuring the interference metric during a time window. In some implementations, generating the overall interference metric includes determining a temporal interference metric for each antenna of the two or more antennas from the interference metrics measured at the antenna during the time window and determining a difference between the temporal interference metrics for the two or more antennas. Determining the temporal interference metric for each antenna may include averaging the interference metrics measured at the antenna during the time window.

In some implementations, the method includes receiving an indication of a length of the time window from the base station and configuring the length of the time window based on the indication. The indication may be received during a radio resource control (RRC) configuration message from the base station. In some implementations, the method includes periodically reporting the overall interference metric to the base station. A length of the time window is based on a periodicity of reporting the overall interference metric.

In some implementations, the method includes receiving one or more of a downlink control information (DCI) or a media access control control element (MAC CE) from the base station. Generating the overall interference metric or transmitting the overall interference metric to the base station is based on the one or more of the DCI or the MAC CE.

The base station may adjust one or more of a modulation and coding scheme (MCS) or a transmission scheduling for the UE based on the overall interference metric.

An example apparatus of a first wireless device includes at least one modem, at least one processor communicatively coupled with the at least one modem, and at least one memory communicatively coupled with the at least one processor. The at least one memory stores processor-readable code that, when executed by the at least one processor in conjunction with the at least one modem, causes the apparatus to: measure an interference metric at each antenna of two or more antennas of the first device for wireless signals transmitted by a second device; generate an overall interference metric based on the interference metrics for the two or more antennas; and transmit the overall interference metric to the second device. In some implementations, the first device is a UE, and the second device is a base station. The base station may be a gNB.

Each interference metric may include one or more of: a CQI; a SINR; a SNR; or instantaneous CSI. In some implementations, each interference metric is measured based on one or more IMR for the UE as defined by the 3GPP set of standards. In some implementations, generating the overall interference metric includes determining a difference between the interference metrics at each antenna of the two or more antennas. The difference may be a distance metric between the interference metrics at each antenna of the two or more antennas. In some implementations, each interference metric is measured based on one or more IMR for the UE as defined by the 3GPP set of standards. Each interference metric may be based on a CLI-RSSI at the two or more antennas.

Measuring the interference metric at each antenna of the two or more antennas may include periodically measuring the interference metric during a time window. In some implementations, generating the overall interference metric includes determining a temporal interference metric for each antenna of the two or more antennas from the interference metrics measured at the antenna during the time window and determining a difference between the temporal interference metrics for the two or more antennas. Determining the temporal interference metric for each antenna may include averaging the interference metrics measured at the antenna during the time window.

In some implementations, execution of the processor-readable code also causes the apparatus to receive an indication of a length of the time window from the base station and configure the length of the time window based on the indication. The indication may be received during a RRC configuration message from the base station. In some implementations, execution of the processor-readable code also causes the apparatus to periodically report the overall interference metric to the base station. A length of the time window is based on a periodicity of reporting the overall interference metric.

In some implementations, execution of the processor-readable code also causes the apparatus to receive one or more of a DCI or a MAC CE from the base station. Generating the overall interference metric or transmitting the overall interference metric to the base station is based on the one or more of the DCI or the MAC CE.

The base station may adjust one or more of a MCS or a transmission scheduling for the UE based on the overall interference metric.

In some implementations, the apparatus also includes at least one transceiver coupled to the at least one modem and the two or more antennas coupled to the at least one transceiver. The at least one transceiver and the two or more antennas may be configured to receive the wireless signals transmitted by the base station and transmit the overall interference metric to the base station.

An example non-transitory, computer-readable medium stores instructions that, when executed by an at least one processor of a first device, cause the first device to measure an interference metric at each antenna of two or more antennas of the first device for wireless signals transmitted by a second device, generate an overall interference metric based on the interference metrics for the two or more antennas, and transmit the overall interference metric to the second device. In some implementations, the first device is a UE, and the second device is a base station. The base station may be a gNB.

Each interference metric may include one or more of: a CQI; a SINR; a SNR; or instantaneous CSI. In some implementations, each interference metric is measured based on one or more IMR for the UE as defined by the 3GPP set of standards. In some implementations, generating the overall interference metric includes determining a difference between the interference metrics at each antenna of the two or more antennas. The difference may be a distance metric between the interference metrics at each antenna of the two or more antennas. In some implementations, each interference metric is measured based on one or more IMR for the UE as defined by the 3GPP set of standards. Each interference metric may be based on a CLI-RSSI at the two or more antennas.

Measuring the interference metric at each antenna of the two or more antennas may include periodically measuring the interference metric during a time window. In some implementations, generating the overall interference metric includes determining a temporal interference metric for each antenna of the two or more antennas from the interference metrics measured at the antenna during the time window and determining a difference between the temporal interference metrics for the two or more antennas. Determining the temporal interference metric for each antenna may include averaging the interference metrics measured at the antenna during the time window.

In some implementations, execution of the instructions also causes the UE to receive an indication of a length of the time window from the base station and configure the length of the time window based on the indication. The indication may be received during a RRC configuration message from the base station. In some implementations, execution of the instructions also causes the UE to periodically report the overall interference metric to the base station. A length of the time window is based on a periodicity of reporting the overall interference metric.

In some implementations, execution of the instructions also causes the apparatus to receive one or more of a DCI or a MAC CE from the base station. Generating the overall interference metric or transmitting the overall interference metric to the base station is based on the one or more of the DCI or the MAC CE.

The base station may adjust one or more of a MCS or a transmission scheduling for the UE based on the overall interference metric.

Another example apparatus of a first device for wireless communication includes means for measuring an interference metric at each antenna of two or more antennas of the first device for wireless signals transmitted by a second device, means for generating an overall interference metric based on the interference metrics for the two or more antennas, and means for transmitting the overall interference metric to the second device. In some implementations, the first device is a UE, and the second device is a base station. The base station may be a gNB.

Each interference metric may include one or more of: a CQI; a SINR; a SNR; or instantaneous CSI. In some implementations, generating the overall interference metric includes determining a difference between the interference metrics at each antenna of the two or more antennas. The difference may be a distance metric between the interference metrics at each antenna of the two or more antennas. In some implementations, each interference metric is measured based on one or more IMR for the UE as defined by the 3GPP set of standards. Each interference metric may be based on a CLI-RSSI at the two or more antennas.

Measuring the interference metric at each antenna of the two or more antennas may include periodically measuring the interference metric during a time window. In some implementations, generating the overall interference metric includes determining a temporal interference metric for each antenna of the two or more antennas from the interference metrics measured at the antenna during the time window and determining a difference between the temporal interference metrics for the two or more antennas. Determining the temporal interference metric for each antenna may include averaging the interference metrics measured at the antenna during the time window.

In some implementations, the apparatus includes means for receiving an indication of a length of the time window from the base station and means for configuring the length of the time window based on the indication. The indication may be received during a RRC configuration message from the base station. In some implementations, the apparatus includes means for periodically reporting the overall interference metric to the base station. A length of the time window is based on a periodicity of reporting the overall interference metric.

In some implementations, the apparatus includes means for receiving one or more of a DCI or a MAC CE from the base station. Generating the overall interference metric or transmitting the overall interference metric to the base station is based on the one or more of the DCI or the MAC CE.

The base station may adjust one or more of a MCS or a transmission scheduling for the UE based on the overall interference metric.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A shows an example of a first 5G NR frame.

FIG. 2B shows example downlink (DL) channels within a 5G NR slot.

FIG. 2C shows an example of a second 5G NR frame.

FIG. 2D shows example uplink (UL) channels within a 5G NR slot.

DETAILED DESCRIPTION

Figure 1:
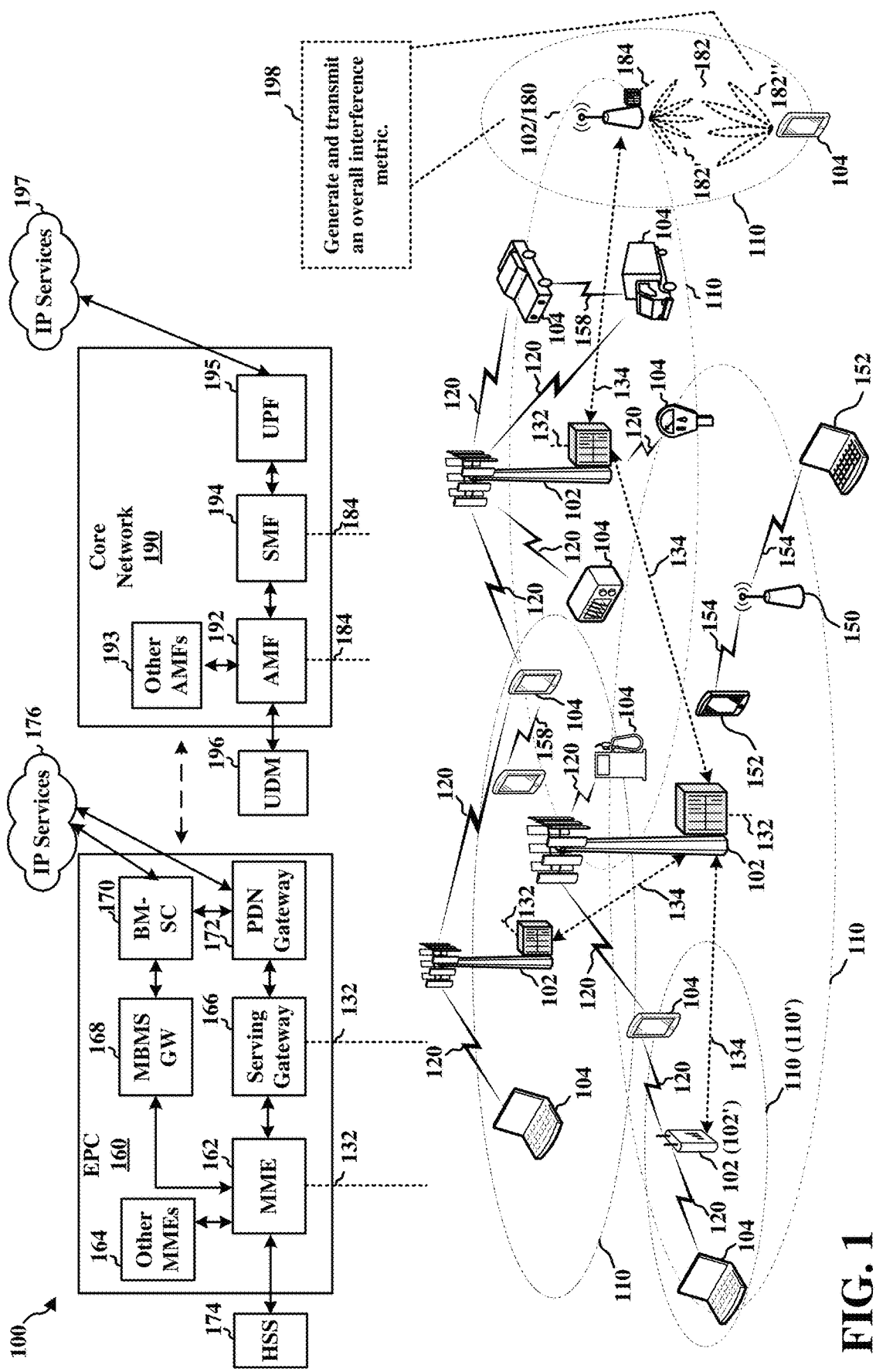
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5G NR (collectively referred to as Next Generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a next generation Node B (gNB), Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Wireless communication devices measure interference metrics during wireless communications. For example, a UE 104 may measure a signal to interference plus noise ratio (SINR) for wireless signals received from a base station 102. However, the interference measured is at a single time instance during reception of the wireless signals or is for wireless signals received at a single antenna.

For temporal variations in interference, before 5G/NR, time division duplexing (TDD) of UL data and DL data is static and synchronized so that UL transmissions do not interfere with DL transmissions. 5G/NR includes an option for dynamic TDD. As a result, UL transmissions from a UE 104 may temporarily interfere with DL transmissions from a base station 102 (such as when the TDD is adjusted for 5G/NR communications). Measured interference metrics at a specific time instance does not account for temporal variations in interference (such as a result of dynamic TDD).

Additionally, 5G/NR includes options for beamforming and other spatial uses of the wireless medium that may cause different interferences at different antennas. As a result, a measured interference metric at a specific antenna of a UE 104 may be less relevant to another antenna of the UE 104 if interference differs at the antennas as a result of beamforming. Previously defined interference metrics measured by the UE 104 do not account for spatial variations in interference (such as the difference in interference between antennas).

Referring again to FIG. 1, in certain aspects, a device may be configured to generate an overall interference metric (that accounts for temporal or spatial variations in interference) and transmit the overall interference metric to another device. For example, the UE 104 may be configured to generate an overall interference metric and transmit the overall interference metric to the base station 102 (198). In some implementations, the base station 102 may determine or adjust a modulation and coding scheme (MCS) for wireless communications with the UE 104 or determine a transmission schedule for the UE 104 based on the overall interference metric received from the UE 104. In some implementations, the base station 102 is a gNB for 5G/NR communications.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A and 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\lambda$ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu * 15$ kKz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 2A-2D provide an example of slot configuration 0 with 14 symbols per slot and numerology $\mu=0$ with 1 slot per subframe. The subcarrier spacing is 15 kHz and symbol duration is approximately 66.7 $\mu$s.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
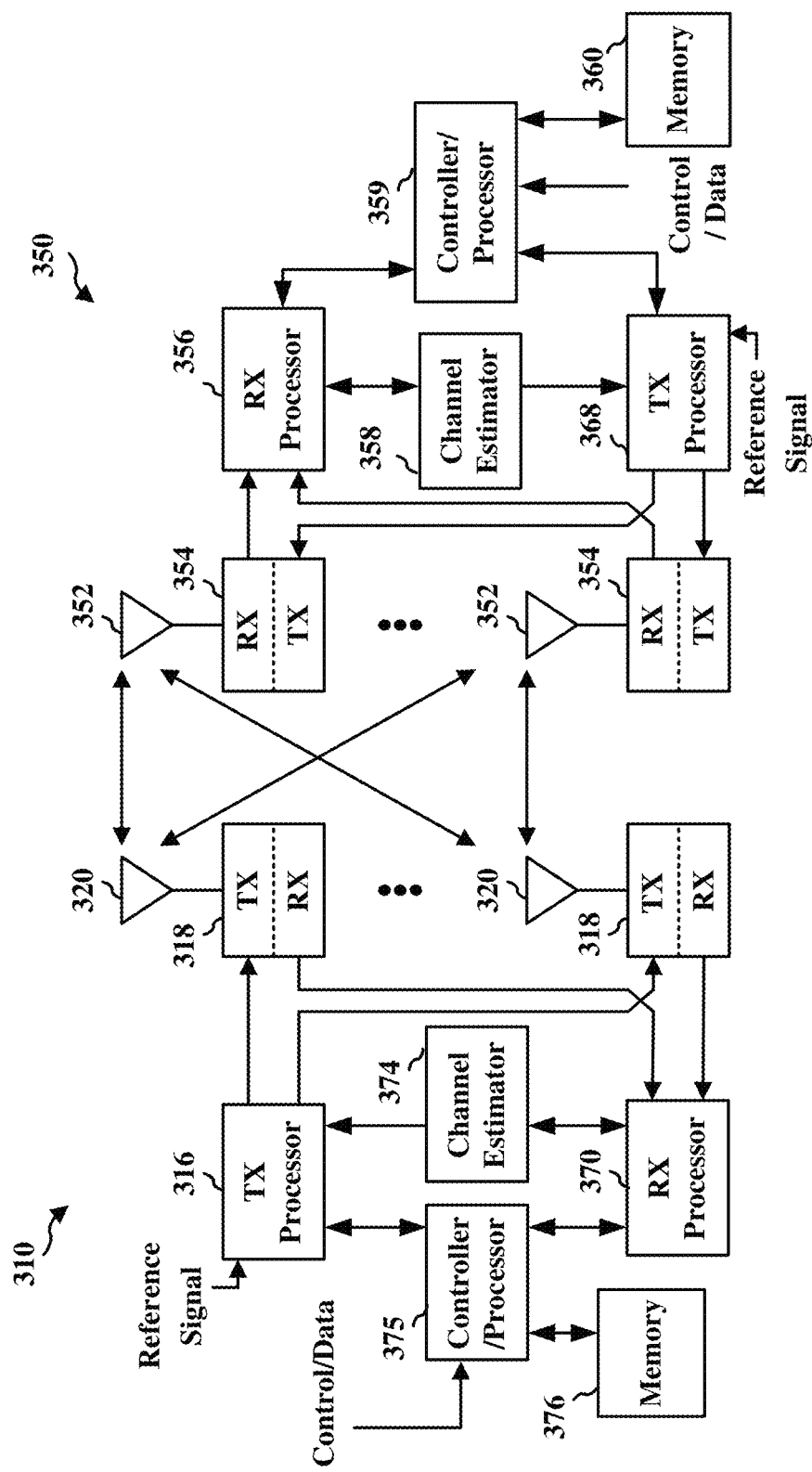
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the MCS, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission. As described herein, the MCS and spatial processing may be based on an overall interference metric received from the UE 350. In some implementations, the overall interference metric may indicate an overall SINR for one or more channels over which the base station 310 and the UE 350 communicate, and the base station 310 may select an MCS index value or a transmission schedule based on the received overall interference metric. For example, if an overall SINR provided by the UE 350 goes below a threshold, the base station 310 may reduce the MCS index value for future transmissions.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. In some implementations, the channel estimator 358 may be configured to perform one or more operations described herein. For example, the channel estimator may measure multiple interference metrics and generate an overall interference metric that accounts for temporal variations or spatial variations in interference. The UE 350 then transmits the overall interference metric to the base station 310 in one or more spatial streams of an UL transmission. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

As noted above, interference is typically measured by a device at a specific time instance or at a specific antenna. For example, a UE may measure an SINR at one time instance during a wireless transmission from a base station to the device, or the UE may measure the SINR at one antenna. The UE may then report the SINR to the base station.

However, interference may be affected at specific time instances by contemporaneous circumstances that may not exist for other time instances (such as based on dynamic TDD). For example, a brief noise may exist and cause interference during one time instance while not existing during other time instances, and the interference measured during that specific time instance may be skewed by the brief noise. As a result, any decisions or actions based on an interference measurement for a specific time instance may be unduly impacted by the brief noise.

Interference may also differ at different antennas of the UE (such as based on beamforming or other spatial uses of the wireless medium). For example, an interference existing at a first antenna may not exist or may be reduced at a second antenna of the UE. As a result, any decisions or actions based on an interference measurement for a specific antenna may be unduly impacted by such interference.

In some implementations, a device may determine an overall interference across multiple time instances or across multiple antennas. As described herein, a device (such as a UE) determines and transmits an overall interference metric that accounts for temporal variations in interference and/or spatial variations in interference.

Figure 4:
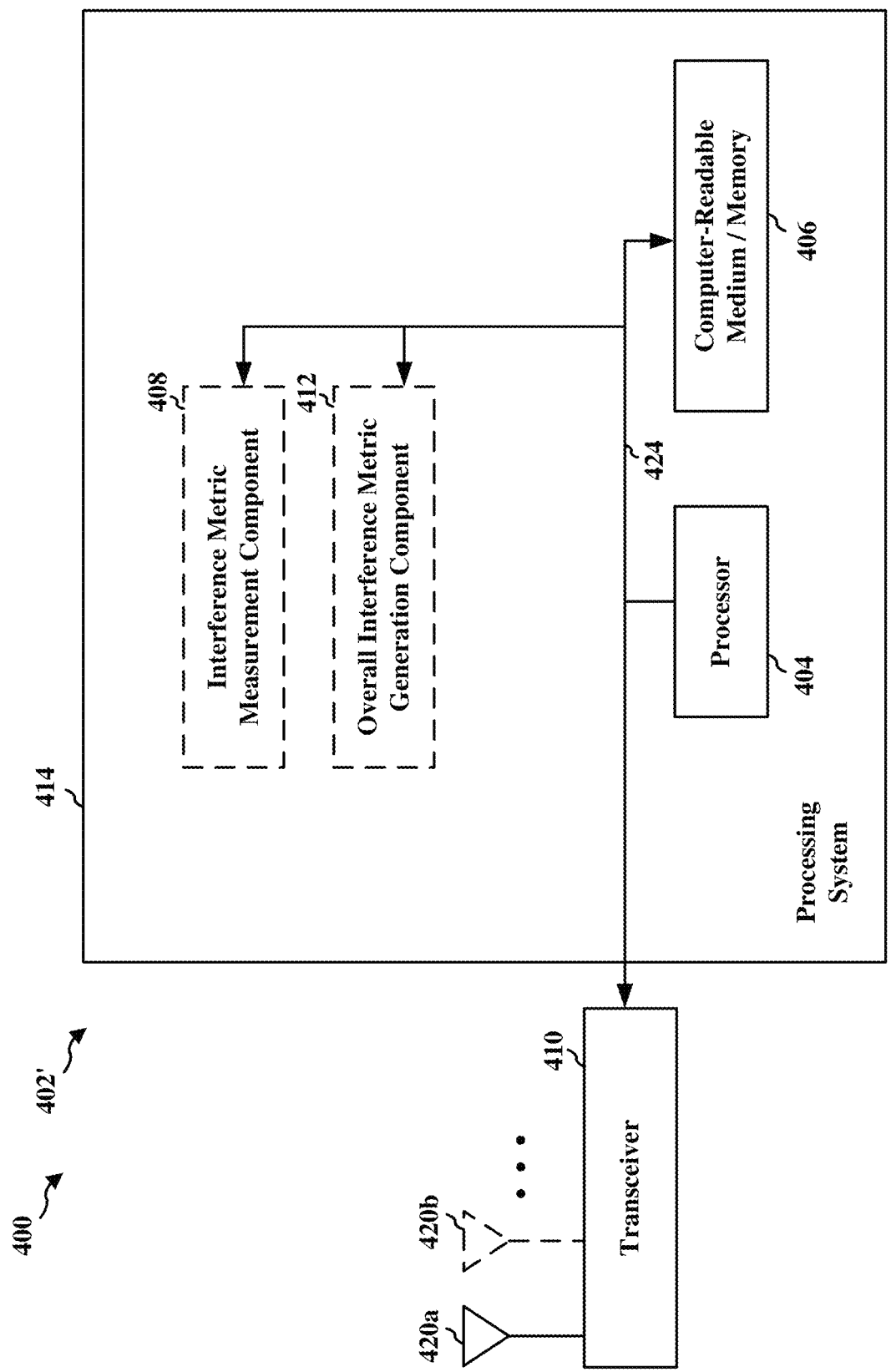
FIG. 4 is a diagram illustrating an example of a hardware implementation for an apparatus employing a processing system.

FIG. 4 is a diagram 400 illustrating an example of a hardware implementation for an apparatus 402' employing a processing system 414 to determine an overall interference metric. The apparatus 402' may be included in a device (such as a UE) configured to generate and transmit an overall interference metric to another device (such as a base station). The processing system 414 may be implemented with a bus architecture, represented generally by the bus 424. The bus 424 may include any number of interconnecting buses and bridges depending on the specific application of the processing system 414 and the overall design constraints. The bus 424 links together various circuits including one or more processors and/or hardware components, represented by the processor 404, the components 408 and 412, and the computer-readable medium/memory 406. The bus 424 may also link various other circuits such as timing sources, peripherals, voltage regulators, and power management circuits, which are well known in the art, and therefore, will not be described any further.

The processing system 414 may be coupled to a transceiver 410. The transceiver 410 is coupled to one or more antennas, including antenna 420a and optionally antenna 420b. The transceiver 410 provides a means for communicating with various other apparatus over a transmission medium. The transceiver 410 receives a signal from the one or more antennas 420a and 420b, extracts information from the received signal, and provides the extracted information to the processing system 414. The interference metric measurement component 408 is configured to measure interference metrics for signals received at the one or more antennas 420a and 420b.

In some implementations, the interference metric measurement component 408 is configured to measure interference metrics at two or more time instances. In some other implementations, the interference metric measurement component 408 is configured to measure interference metrics at two or more antennas (such as antenna 420a and antenna 420b) when receiving the signals. The overall interference metric generation component 412 is configured to generate an overall interference metric from the interference metrics measured by the interference metric measurement component 408. For example, if the interference metric measurement component 408 measures an SINR at different time instances or at antenna 420a and antenna 420b, the overall interference metric generation component 412 may determine an average of the SINRs (or other suitable metric accounting for variations in the interference) as the overall interference metric.

In addition, the transceiver 410 receives information from the processing system 414, such as the overall interference metric from the overall interference metric generation component 412, and based on the received information, generates a signal to be applied to the one or more antennas. The processing system 414 includes a processor 404 coupled to a computer-readable medium/memory 406. The processor 404 is responsible for general processing, including the execution of software stored on the computer-readable medium/memory 406. The software, when executed by the processor 404, causes the processing system 414 to perform the various functions described herein for any particular apparatus. The computer-readable medium/memory 406 may also be used for storing data that is manipulated by the processor 404 when executing software. The processing system 414 further includes at least one of the components 408 and 412. The components may be software components running in the processor 404, resident/stored in the computer readable medium/memory 406, one or more hardware components coupled to the processor 404, or some combination thereof. In some implementations, the processing system 414 may be a component of the base station 310 and may include the memory 376 and/or at least one of the TX processor 316, the RX processor 370, and the controller/processor 375. The processing system 414 may also include the channel estimator 374. In some other implementations, the processing system 414 may be a component of the UE 350 and may include the memory 360 and/or at least one of the TX processor 368, the RX processor 356, and the controller/processor 359. The processing system 414 may also include the channel estimator 358.

While the following examples may be described as being performed by the apparatus 402' in FIG. 4, any suitable apparatus or device may perform operations disclosed herein. Additionally, while the following examples may be described with reference to a UE generating an overall interference metric and transmitting the metric to a base station, the described operations may be performed by other suitable devices. For example, the operations may be performed by two UEs performing device to device communications or by two base stations communicating via a wireless backhaul.

A UE may measure a plurality of interference metrics for wireless signals received from a base station. As used herein, an interference metric may be a signal, value, frame, or other indication of an interference measured for one or more wireless signals from the base station. Example interference metrics include a channel quality indicator (CQI), an SINR, a signal to noise ratio (SNR), and an instantaneous channel state information (CSI). For example, a UE may measure an SINR at different time instances or at different antennas. However, any suitable interference metric may be measured, including other interference metrics or channel estimations defined by the 3GPP set of standards (such as for LTE or 5G/NR wireless communications).

If the interference metrics are measured at different time instances, the interference metrics may differ from one another based on time (referred to as a temporal variation). If the interference metrics are measured at different antennas, the interference metrics may differ from one another based on the different locations of the antennas (referred to as a spatial variation). The UE may therefore generate an overall interference metric that accounts for temporal variations or spatial variations in interference. For example, the UE may determine, from the plurality of interference metrics, a simple average, a weighted average, a median, a variance, a standard deviation, a maximum, a minimum, a distribution of the interference metrics, a difference, a distance between metrics, or any other suitable metric that takes into account variations in the interference metrics.

Figure 5:
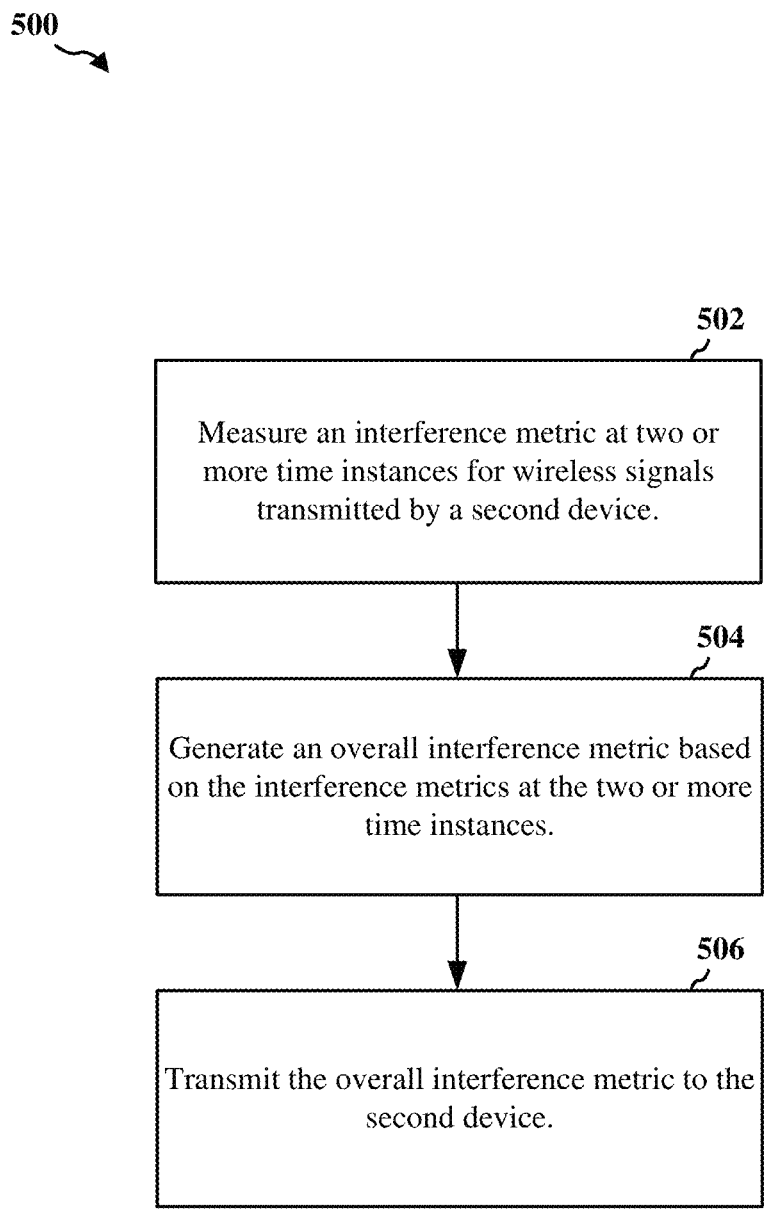
FIG. 5 is a flowchart of a method of generating and transmitting an overall interference metric for interference metrics varying over time.
Figure 6:
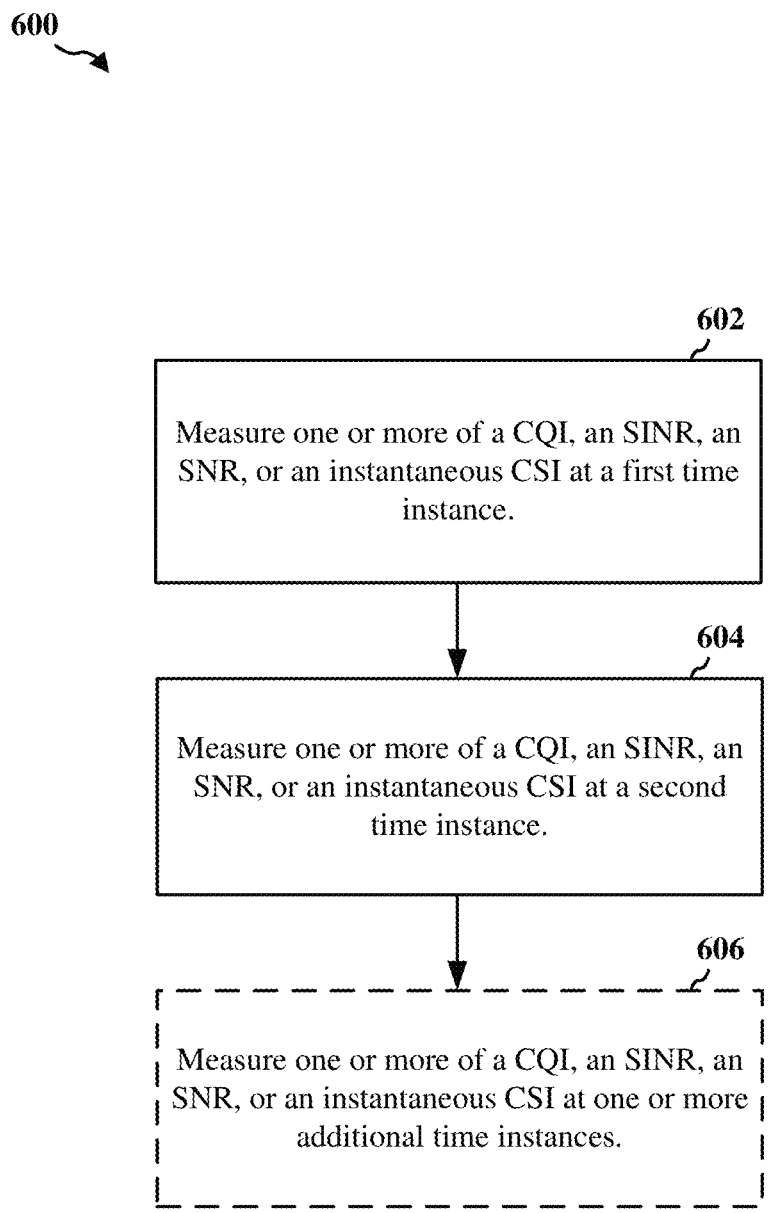
FIG. 6 is a flowchart of a method of measuring interference metrics at multiple time instances.
Figure 7:
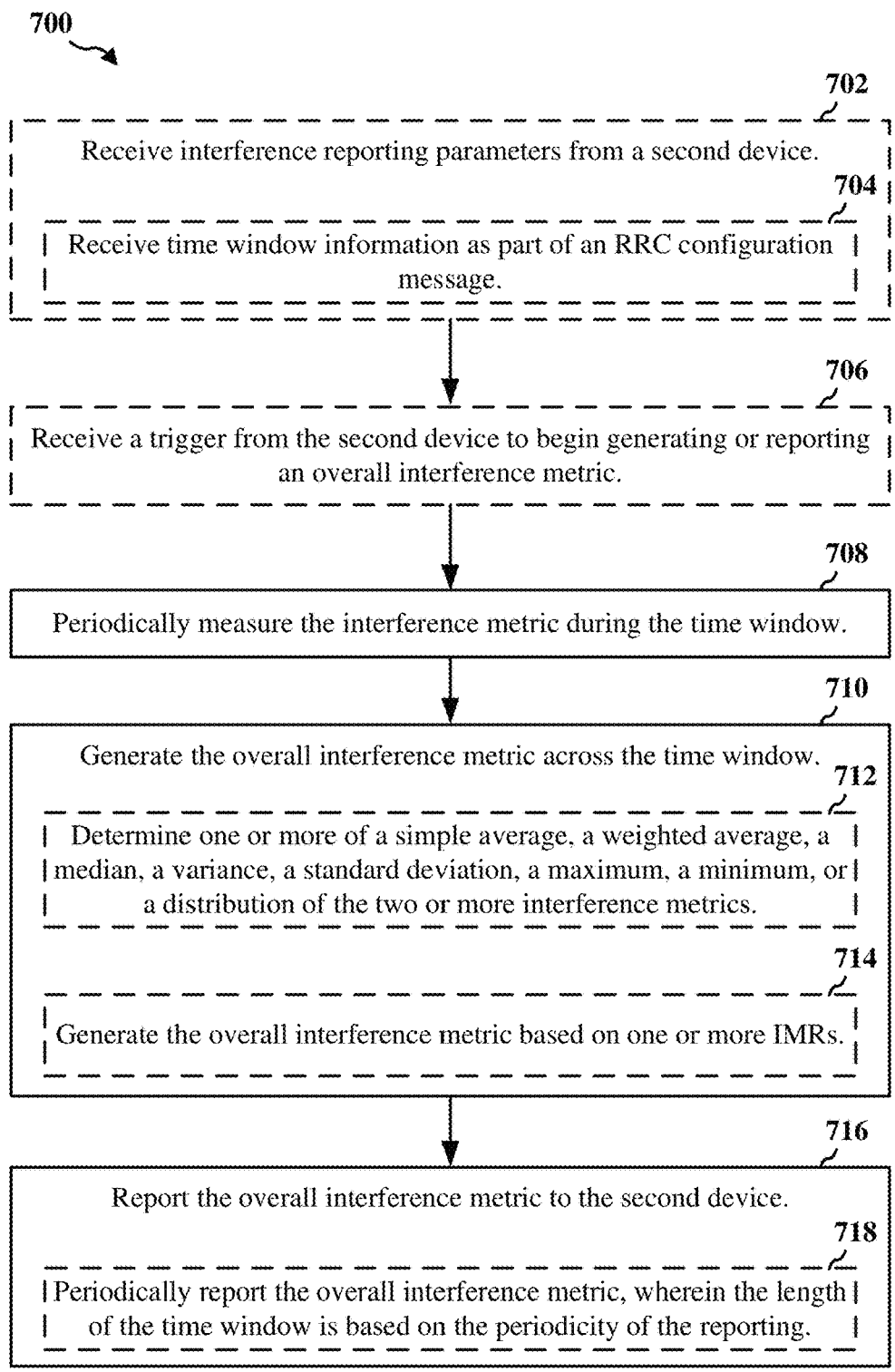
FIG. 7 is a flowchart of a method of generating and reporting an overall interference metric associated with temporal variations in interference.
Figure 8:
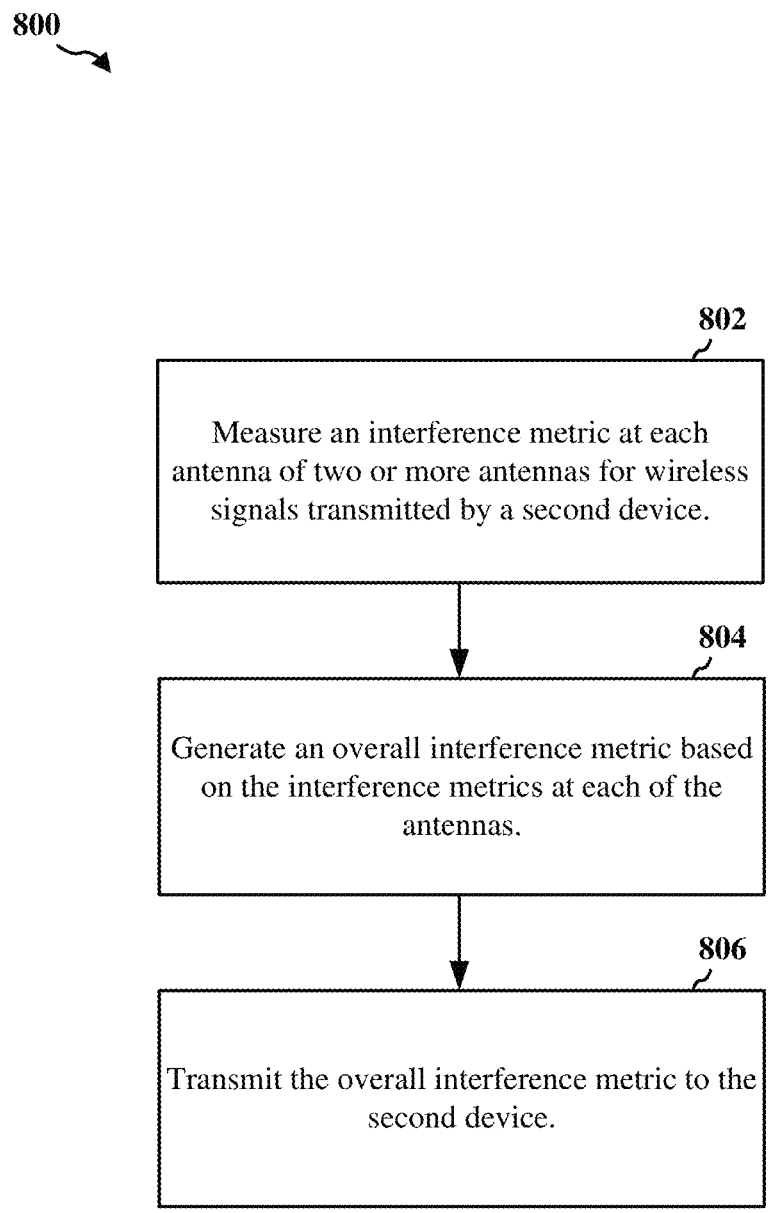
FIG. 8 is a flowchart of a method of generating and transmitting an overall interference metric for interference metrics varying between antennas.
Figure 9:
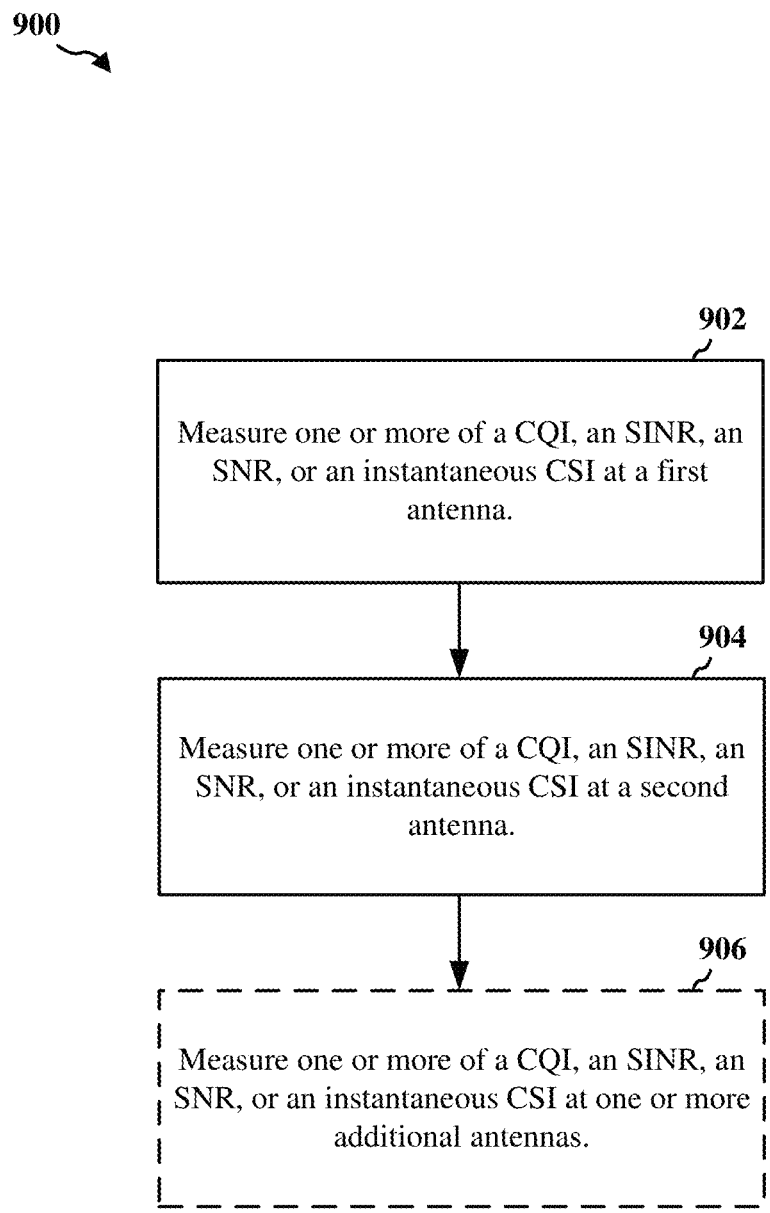
FIG. 9 is a flowchart of a method of measuring interference metrics at multiple antennas.
Figure 10:
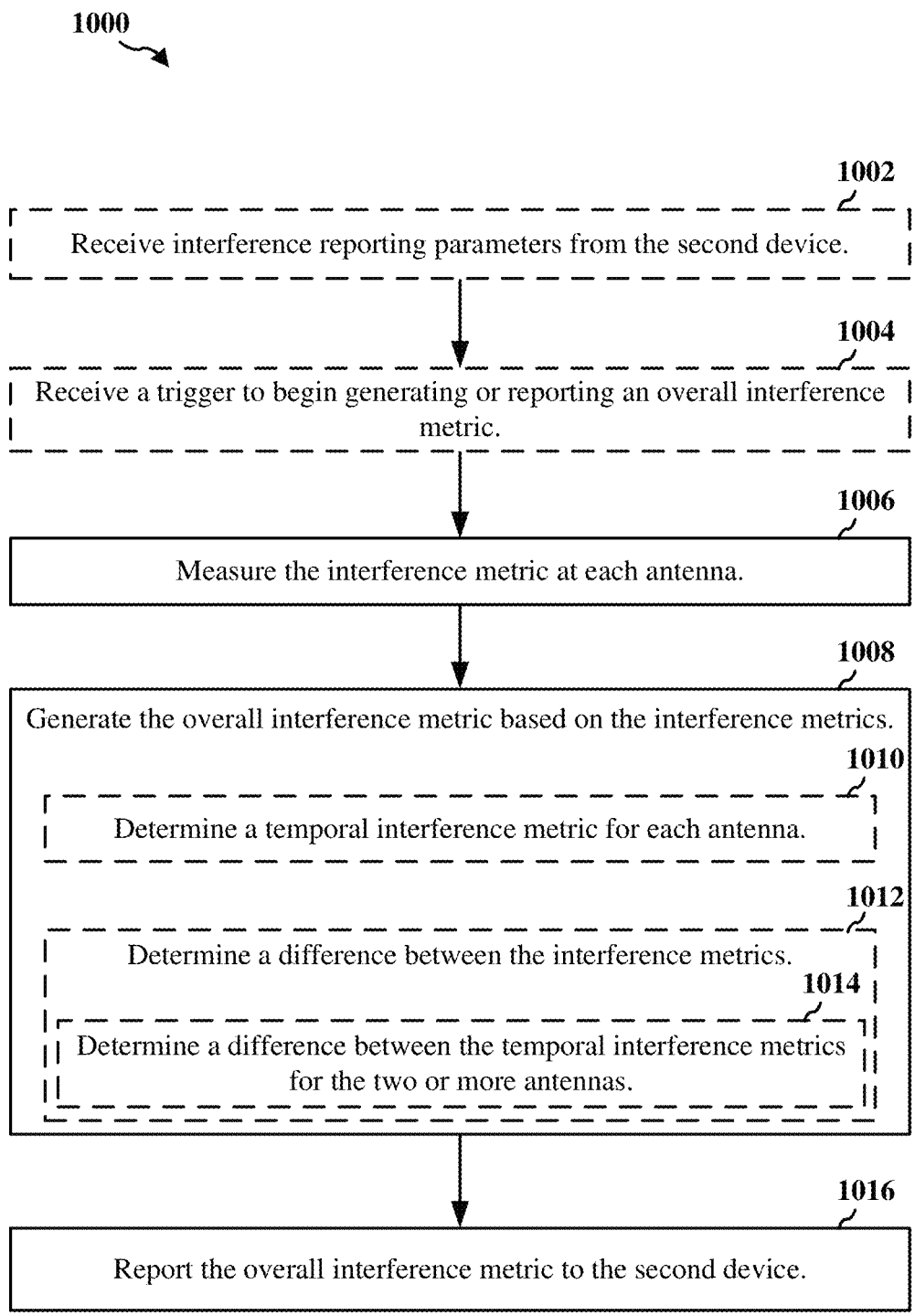
FIG. 10 is a flowchart of a method of generating and reporting an overall interference metric associated with spatial variations in interference.

FIGS. 5-7 illustrate example operations for generating and transmitting an overall interference metric associated with a temporal variation in interference. FIGS. 8-10 illustrate example operations for generating and transmitting an overall interference metric associated with a spatial variation in interference. In some implementations, an overall interference metric may take into account temporal variations in interference and spatial variations in interference.

Temporal Variations in Interference

FIG. 5 is a flowchart of a method 500 of generating and transmitting an overall interference metric for measured interference metrics varying over time. At 502, the apparatus 402' measures an interference metric at two or more time instances for wireless signals transmitted by a second device and received at the antenna 420a. For example, the UE 350 (FIG. 3) receives wireless signals from the base station 310 at one or more antennas 352. During reception of the wireless signals, the UE 350 measures an interference metric (such as an SINR or other suitable metric) at two or more different time instances. At 504, the apparatus 402' generates an overall interference metric based on the interference metrics at the two or more time instances. For example, the UE 350 determines a metric that takes into account the temporal variations in the interference metrics measured at different time instances.

In some implementations, the apparatus 402' periodically measures an interference. The measured interference metrics may be persisted for a predefined amount of time, and the apparatus 402' generates the overall interference metric from a number of persisted interference metrics. For example, the apparatus 402' may measure an interference metric every millisecond, and the apparatus 402' may generate an overall interference metric for a time window of ten milliseconds. In this manner, the apparatus 402' uses the last nine or ten interference metrics measured during the time window to generate the overall interference metric. For example, the apparatus 402' may determine an average, a variance, and so on of the last ten interference metrics.

At 506, the apparatus 402' transmits the overall interference metric to the second device. For example, the UE 350 transmits the overall interference metric to the base station 310. The UE 350 may transmit the metric in a proprietary or standardized information element (IE) to the base station 310. For example, a packet format may be defined to include the overall interference metric.

In some implementations, the base station 310 determines an MCS or transmission scheduling with the UE 350 based on the overall interference metric. For example, if an averaged SINR is below a threshold, the base station 310 may reduce the MCS index value for future transmissions to the UE 350. In another example, if the distribution or distance between SINRs across different time instances increases, the base station 310 may reduce the MCS index value for future transmissions to the UE 350. Since the overall interference metric takes into account temporal variations in the measured interference metrics, the determinations made by the base station 310 are less prejudiced by temporal variations in interference than if based on a single measured interference metric.

As noted herein, the apparatus 402' may measure an interference metric at two or more time instances. FIG. 6 is a flowchart of a method 600 of measuring interference metrics at multiple time instances. At 602, the apparatus 402' measures one or more of a CQI, an SINR, an SNR, or an instantaneous CSI at a first time instance. At 604, the apparatus 402' measures one or more of a CQI, an SINR, an SNR, or an instantaneous CSI at a second time instance. In some implementations, the apparatus 402' measures one or more of a CQI, an SINR, an SNR, or an instantaneous CSI at one or more additional time instances (606). While some example measurements of interference are disclosed in FIG. 6, any suitable interference metric may be measured.

As noted herein, example interference metrics include one or more of a CQI, an SINR, an SNR, or an instantaneous CSI. Any suitable portion of transmissions from the base station 310 to the UE 350 (such as any suitable reference signal) may be used to measure an interference metric (such as an SINR). In some implementations, one or more existing interference measurement resources (IMR) of the UE 350 are used in measuring the interference metric. Various releases of the set of standards from 3GPP define IMR elements. In one example, 3GPP Release 8 defines a cell-specific reference signal (CRS) that may be used for interference measurement. Other possible IMR elements include a Channel State Information Reference Signal (CSI-RS) and a zero-power CSI-RS. In some implementations, an IMR is a set of specific resource elements reserved for interference measurement. The base station 310 may indicate the IMR in an RRC configuration message. In this manner, the base station 310 indicates the frequency and location of resource elements of the IMR in the transmissions to the UE 350. While some example elements that may be used for measuring interference metrics are disclosed, any suitable portion of the communications between devices may be used. Additionally, any suitable channel may be used for the interference measurements. For example, portions of the PDCCH or the PDSCH may be used for interference metric measurements.

In some implementations, one or more interference metrics may be based on a received signal strength indicator (RSSI). For example SINR and SNR are based on an RSSI. For 5G/NR communications, a cross-link (CL) RSSI may be used for measuring SINR or SNR of the transmissions from the base station 310 to the UE 350. As a result, the interference metrics and the generated overall interference metric may be based on a CLI-RSSI.

Various aspects of determining an interference metric in light of temporal variations in interference are disclosed above. FIG. 7 is a flowchart of a method 700 of generating and reporting an overall interference metric associated with temporal variations in interference. The example method 700 includes aspects of determining the interference metric described above.

In some implementations, the base station 310 indicates interference reporting parameters to the UE 350. For example, the base station 310 indicates the elements of the IMR to be used for measuring an interference metric. The base station 310 may also indicate a time window length for generating an overall interference metric, a periodicity of measuring an interference metric, or how or when the UE 350 is to report the overall interference metric to the base station 310.

At 702, the apparatus 402' (such as a UE 350) may receive interference reporting parameters from a second device (such as a base station 310). The reporting parameters may include parameters for determining the overall interference metric. For example, if an interference metric is measured multiple times during a time window, the parameters may define the length of the time window and the periodicity of interference measurement during the time window.

In some implementations, the apparatus 402' receives time window information as part of an RRC configuration message (704). In this manner, the apparatus 402' configures generating and reporting an overall interference metric to the second device. For example, the RRC configuration message may indicate that an average SINR is to be determined for a defined time window with SINR measurements occurring at a defined periodicity. If the apparatus 402' is generating an overall interference metric and reporting the metric to the second device, the apparatus 402' may adjust the generating and reporting of the metric based on the RRC configuration message.

In some implementations, the apparatus 402' may not begin generating an overall interference metric or reporting the overall interference metric to the second device until triggered by the second device. For example, the UE 350 may not generate or may not transmit an overall interference metric to the base station 310 until triggered by the base station. In some implementations, the apparatus 402' receives a trigger from the second device to begin generating or reporting an overall interference metric (706). For example, a base station 310 may transmit downlink control information (DCI) or a MAC control element (CE) to trigger the UE 350 to begin generating or begin reporting the overall interference metric to the base station 310.

At 708, the apparatus 402' periodically measures the interference metric during the time window. As noted above, the time window and interference measurement periodicity may be defined by the base station 310. For example, if the reporting of the overall interference metric to the base station 310 is aperiodic, the base station 310 may define the length of the time window, and the UE 350 may transmit the overall interference metric to the base station 310 after a time window. In another example, the periodicity of measuring an interference measurement is based on the IMR defined by the base station 310.

In some other implementations, the time window length may be based on a periodicity of reporting the overall interference metric to the base station 310. For example, the length of the time window may approximately equal the length of time between reporting successive overall interference metrics. Other suitable means may also be used for determining the length of the time window or when to report the overall interference metric to the base station 310. For example, the time window and when to report may be predefined by the UE 350.

At 710, the apparatus 402' generates the overall interference metric across the time window. In some implementations, the apparatus 402' determines one or more of a simple average, a weighted average, a median, a variance, a standard deviation, a maximum, a minimum, or a distribution of the two or more interference metrics (712). At 714, the apparatus 402' reports the overall interference metric to the second device. For example, the UE 350 transmits an overall interference metric for a time window to the base station 310. In some implementations, the UE 350 periodically reports the overall interference metric to the base station 310 for different time windows (716). As noted above, the length of the time window may be based on the periodicity of reporting. Otherwise, the length of the time window may be set by the base station 310 or determined by the UE 350.

Above aspects of the disclosure describe an interference metric associated with temporal variations in interference. An interference metric may additionally or alternatively be associated with spatial variations in interference. For example, an overall interference metric may take into account differences in interference at different antennas of the UE 350.

Spatial Variations in Interference

FIG. 8 is a flowchart of a method 800 of generating and transmitting an overall interference metric for interference metrics varying between antennas. The apparatus 402' includes at least antenna 420a and antenna 420b. In some implementations, the apparatus 402' may include additional antennas (such as for three or more spatial streams). At 802, the apparatus 402' measures an interference metric at each antenna for wireless signals transmitted by a second device. For example, a UE 350 measures an interference metric at antenna 420a and measures an interference metric at antenna 420b. Similar to disclosed above with reference to interference metrics at different time instances, the interference metric at an antenna may be any suitable metric (such as an SINR, SNR, and so on), may be measured for any suitable IMR or portion of the DL transmission, may be measured for any suitable channel occupied by the antenna, and may be based on RSSI (such as CLI-RSSI) or another suitable indicator.

At 804, the apparatus 402' generates an overall interference metric based on the interference metrics measured at each of the antennas of the apparatus 402'. Similar to disclosed above with reference to generating an overall interference metric associated with temporal variations in interference, an example overall interference metric may include one or more of a simple average, a weighted average, a median, a variance, a standard deviation, a maximum, a minimum, or a distribution or distance between the interference metrics. In some implementations, the overall interference metric is a difference between the interference metrics across the antennas. For example, the difference is a calculated distance between the interference metrics across the antennas. The overall interference metric may include interference metrics for all antennas of the apparatus 402' or for only a subset of the antennas of the apparatus 402'.

At 806, the apparatus 402' may transmit the overall interference metric to the second device. For example, after the UE 350 generates an overall interference metric (such as a distance between SINRs measured at a first antenna and at a second antenna), the UE 350 may transmit the overall interference metric to the base station 310. Similar to disclosed above for transmitting an overall interference metric associated with temporal variations in interference, the overall interference metric (associated with spatial variations in interference) may be transmitted in any suitable manner (such as in a standardized or proprietary IE or suitable packet from the UE 350 to the base station 310).

The base station 310 may determine or adjust an MCS or transmission scheduling to the UE 350 based on the overall interference metric. In some implementations, the MCS or scheduling may be specific to an antenna or spatial stream. For example, if the overall interference metric is a difference between an SINR measured at antenna 420a of the apparatus 402' and an SINR measured at antenna 420b of the apparatus 402', and the difference indicates that the SINR is higher at the first antenna 420a than the second antenna 420b, the second device (such as a base station 310) may select a higher MCS index value for the data transmitted to the antenna 420a than an MCS index value used for the data transmitted to the antenna 420b.

As noted herein, the apparatus 402' may measure an interference metric at two or more antennas (such as antennas 420a and 420b). FIG. 9 is a flowchart of a method 900 of measuring interference metrics at multiple antennas. At 902, the apparatus 402' measures one or more of a CQI, an SINR, an SNR, or an instantaneous CSI at a first antenna (such as antenna 420a). At 904, the apparatus 402' measures one or more of a CQI, an SINR, an SNR, or an instantaneous CSI at a second antenna (such as antenna 420b). The measurement at the first antenna may be concurrent with the measurement at the second antenna. In some implementations, the apparatus 402' measures one or more of a CQI, an SINR, an SNR, or an instantaneous CSI at one or more additional antennas of the apparatus 402' (906). While some example measurements of interference are disclosed in FIG. 9, any suitable interference metric may be measured.

As described above, the apparatus 402' may generate the overall interference metric from the measured interference metrics at the antennas of the apparatus 402'. In some other implementations, the apparatus 402' may first generate, for each antenna, a temporal interference metric that is associated with temporal variations in interference at a specific antenna. The apparatus 402' may then generate an overall interference metric from the generated temporal interference metrics. For example, an interference metric may be measured periodically during a time window at each antenna. The interference metrics measured during the time window for an antenna ma then be used to generate a temporal interference metric for the antenna. In one example, the apparatus 402' measures an SINR periodically at antenna 420a and at antenna 420b during a time window. The apparatus 402' then determines an average of the SINRs measured during the time window for antenna 420a, and the apparatus 402' determines an average of the SINRs measured during the time window for antenna 420b. The apparatus 402' then determines a difference between the averaged SINRs between the antennas 420a and 420b. In this manner, the overall interference metric may be associated with temporal variations in interference and spatial variations in interference.

FIG. 10 is a flowchart of a method 1000 of generating and reporting an overall interference metric associated with spatial variations in interference. In some implementations, the base station 310 may indicate, to the UE 350, one or more parameters for determining and reporting the overall interference metric. For example, the base station 310 indicates the elements of the IMR to be used for measuring an interference metric. The base station 310 may also indicate a time window length (if a temporal interference metric is determined before generating an overall interference metric), a periodicity of measuring an interference metric, or how or when the UE 350 is to report the overall interference metric to the base station 310. In some implementations, the base station 310 may indicate the antennas of the UE 350 at which the UE is to measure interference metrics. For example, the base station may indicate specific antennas of the UE, may indicate whether all antennas are a subset of the antennas are to have interference metrics measured, and so on.

At 1002, the apparatus 402' (such as a UE 350) may receive interference reporting parameters from a second device (such as a base station 310). The reporting parameters may include parameters for determining the overall interference metric. For example, if an interference metric is measured multiple times during a time window for each antenna, the parameters may define the length of the time window and the periodicity of interference measurement during the time window. In another example, the parameters may indicate if interference metrics are to be measured at each antenna of the UE 350. In some other examples, the parameters may indicate the interference metrics of specific antennas are to be used in generating an overall interference metric. In some implementations, the parameters may be received as part of an RRC configuration message.

The apparatus 402' may not begin generating an overall interference metric or begin reporting the overall interference metric to the second device until triggered by the second device. For example, the UE 350 may not generate or may not transmit an overall interference metric to the base station 310 until triggered by the base station. In some implementations, the apparatus 402' receives a trigger from the second device to begin generating or reporting an overall interference metric (1004). For example, a base station 310 may transmit DCI or a MAC CE to trigger the UE 350 to begin generating or begin reporting the overall interference metric to the base station 310.

At 1006, the apparatus 402' measures the interference metric at each antenna (such as at antennas 420a and 420b). If the overall interference metric is based on temporal interference metrics at the antennas (such as an average SINR over two or more SINRs measured at an antenna at different time instances), the apparatus 402' may periodically measure an interference metric at each antenna (such as during a time window). At 1008, the apparatus 402' generates the overall interference metric based on the measured interference metrics at each antenna. In some implementations, the apparatus 402' determines a temporal interference metric for each antenna (1010). For example, if an SINR at antenna 420a and an SINR at antenna 420b is measured at multiple time instances during a time window, the SINRs for the antenna 420a may be averaged and the SINRs for the antenna 420b may be averaged (or a median determined, a variance determined, or another suitable temporal metric).

In generating the overall interference metric, the apparatus 402' may determine a difference between interference metrics (1012). If temporal interference metrics are not determined (such as in optional step 1010), and the overall interference metric is generated directly from the measured interference metrics at each antenna, the apparatus 402' may determine a difference between the interference metrics measured in step 1006. If temporal interference metrics are determined in optional step 1010, the apparatus 402' may determine a difference between the temporal interference metrics for the two or more antennas (1014). For example, the apparatus 402' may determine a distance between an average SINR at antenna 420a and an average SINR at antenna 420b. In some implementations, the apparatus 402' determines one or more of a simple average, a weighted average, a median, a variance, a standard deviation, a maximum, a minimum, or a distribution of two or more interference metrics (such as interference metrics measured at each antenna or temporal interference metrics generated from the measured interference metrics at each antenna). At 1016, the apparatus 402' reports the overall interference metric to the second device. For example, the UE 350 transmits a determined distance between two or more interference metrics to the base station 310.

Any of the disclosed aspects in determining and reporting interference metrics associated with temporal variations in interference may be combined with aspects of determining interference metrics associated with spatial variations in interference. For example, if the apparatus 402' measures an interference metric at each antenna periodically during a time window, the time window length may be based on a periodicity of reporting the overall interference metric to the base station 310. For example, the length of the time window may approximately equal the length of time between reporting successive overall interference metrics.

Figure 11:
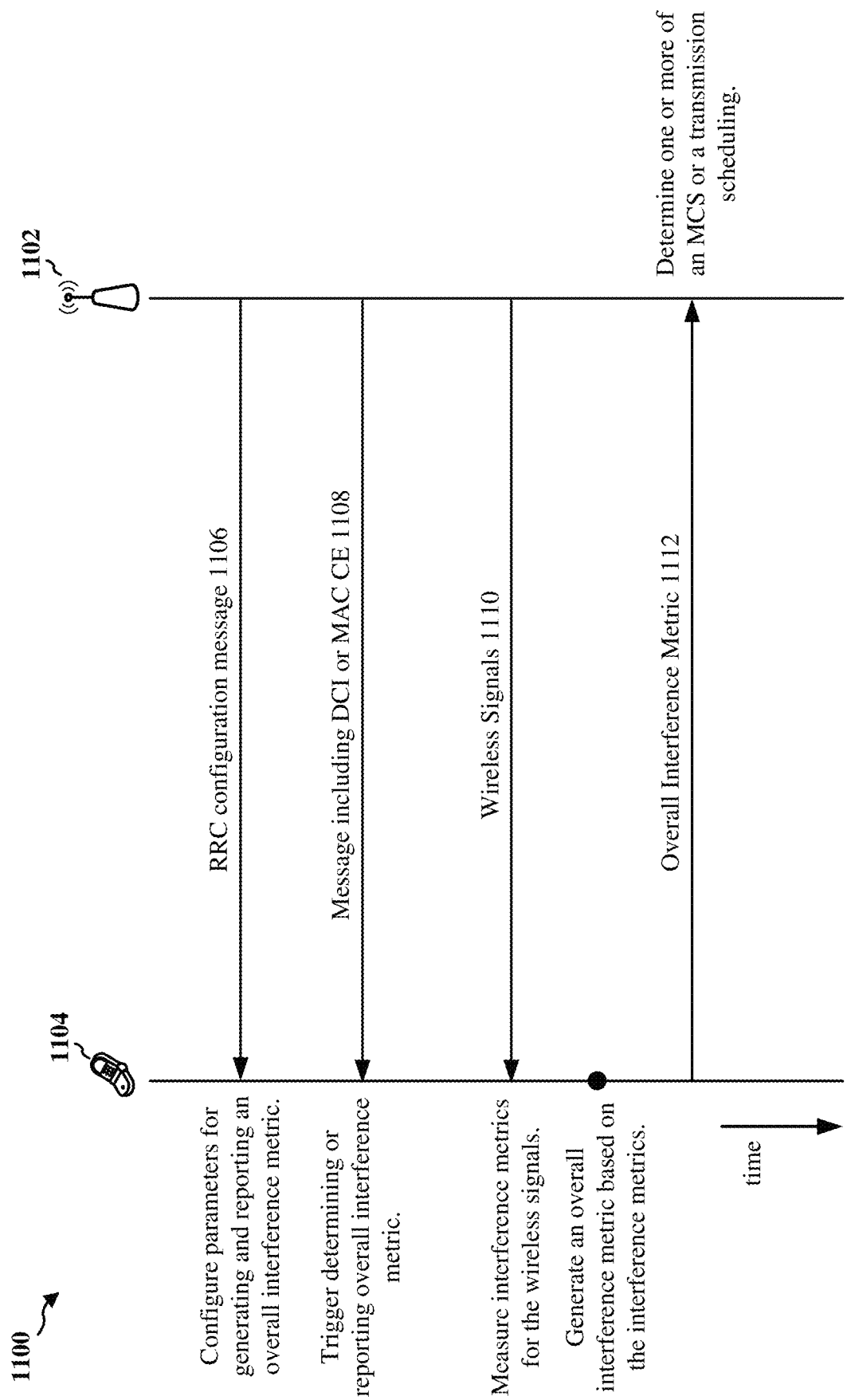
FIG. 11 is a signaling diagram between a user equipment and a base station.

To illustrate an example timing of communications between a UE and a base station, FIG. 11 is a timing diagram 1100 of example communications between a base station 1102 (such as base station 102 in FIG. 1 or base station 310 in FIG. 3) and a UE 1104 (such as the UE 104 in FIG. 1 or the UE 350 in FIG. 3). The base station 1102 transmits an RRC configuration message 1106 to the UE 1104. The RRC configuration message 1106 indicates one or more parameters for generating an overall interference metric and/or reporting the overall interference metric. In response to receiving the RRC configuration message 1106, the UE 1104 configures one or more parameters for generating and reporting an overall interference metric. For example, the UE 1104 may set a time window length, determine the antennas for which to measure an interference metric, set which IMR elements or portions of the transmissions from the base station 1102 to use for interference measurement, set the overall interference metric to be determined (such as an average, a difference, and so on), set a periodicity for reporting the overall interference metric, set a periodicity for measuring an interference metric, determine which interference metric to measure, and so on.

The base station 1102 also transmits a message including DCI or a MAC CE 1108 to trigger determining or reporting an overall interference metric. In some implementations, the UE 1104 periodically determines an overall interference metric, and the UE 1104 is triggered to report the determined overall interference metrics in response to receiving the message 1108. In some other implementations, the UE 1104 is triggered to determine an overall interference metric in response to receiving the message 1108.

The base station 1102 transmits one or more wireless signals 1110 to the UE 1104. For example, data may be transmitted on a PDSCH, or control information may be transmitted on a PDCCH. The UE 1104 may measure interference metrics for any suitable portion of the wireless signals 1110 received from the base station 1102, and the UE 1104 generates an overall interference metric based on the measured interference metrics. The UE 1104 may then transmit the overall interference metric 1112 to the base station 1102. The base station 1102 may determine one or more of an MCS or a transmission scheduling based on the received overall interference metric 1112. Other suitable decisions for future transmissions may also be made by the base station 1102 based on the received overall interference metric 1112.

Figure 12:
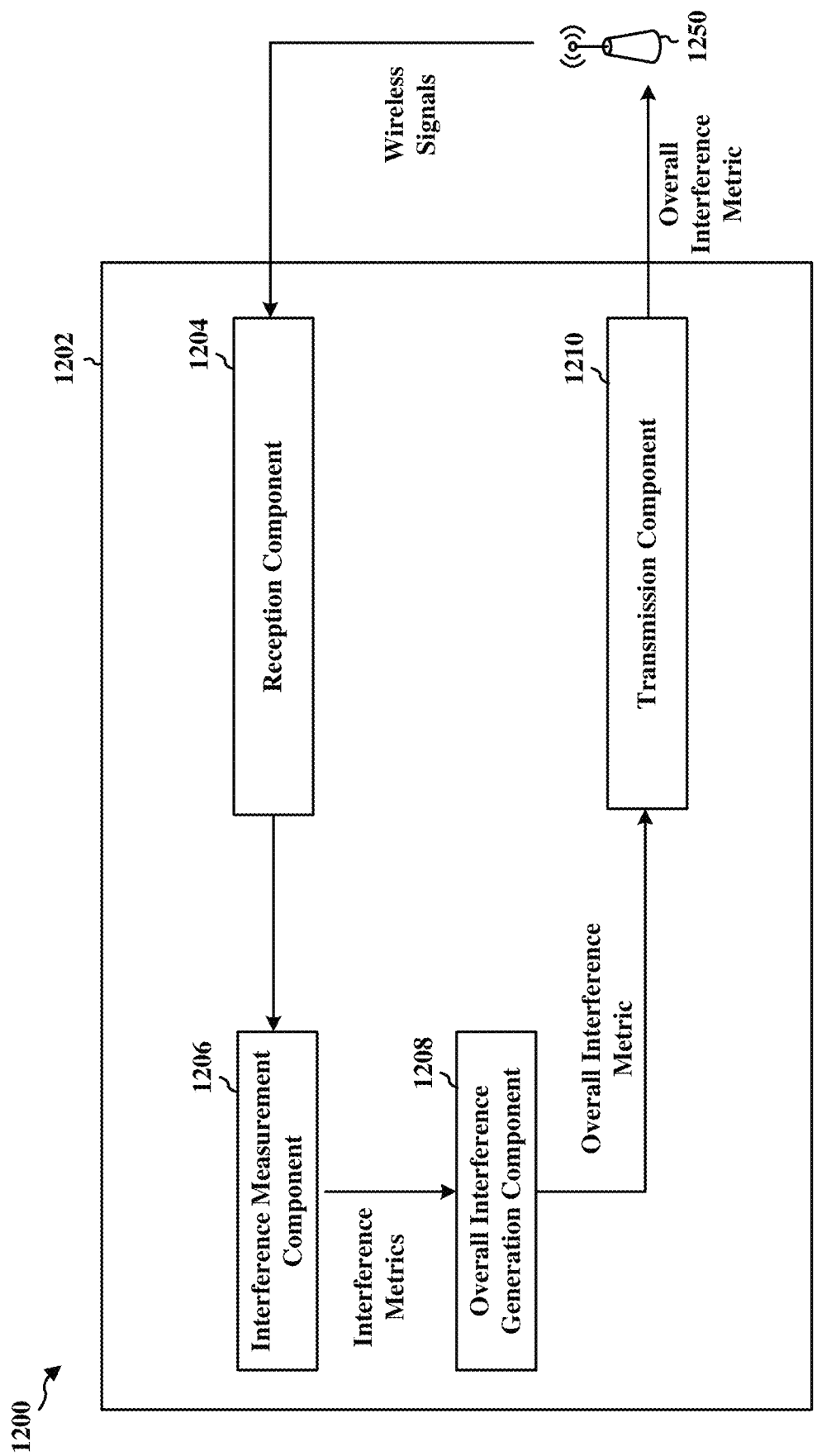
FIG. 12 is a conceptual data flow diagram illustrating the data flow between different means/components in an example apparatus.

FIG. 12 is a conceptual data flow diagram 1200 illustrating the data flow between different means/components in an example apparatus 1202 to perform one or more operations described herein. The apparatus 1202 may be an illustration of a conceptual flow in apparatus 402' in FIG. 4, and may correspond to a UE (such as UE 350 in FIG. 3). The apparatus 1202 includes a reception component 1204 configured to receive one or more wireless signals from the base station 1250. The reception component 1204 may also be configured to receive an RRC configuration message, DCI, a MAC CE, or other information for configuring the apparatus 1202 to determine and report an overall interference metric. The apparatus 1202 also includes an interference measurement component 1206 to measure interference metrics at two or more antennas and/or at two or more time instances, an overall interference generation component 1208 to generate the overall interference metric based on the interference metrics, and a transmission component 1210 to transmit the overall interference metric to the base station 1250.

The apparatus 1202 may include additional components that perform each of the blocks of the algorithm in the aforementioned flowcharts of FIGS. 5-10. As such, each block in the aforementioned flowcharts of FIGS. 5-10 may be performed by a component and the apparatus 1202 may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof (such as illustrated in FIG. 4).

In one configuration, the apparatus 1202 includes means for performing one or more of the operations described herein. The aforementioned means may be one or more of the aforementioned components of the apparatus 1202 and/or the processing system 414 of the apparatus 402'. The processing system 414 may include the TX Processor 368, the RX Processor 356, and the controller/processor 359 in FIG. 3. As such, in one configuration, the aforementioned means may be the TX Processor 368, the RX Processor 356, and the controller/processor 359 configured to perform the functions recited by the aforementioned means.

Aspects of the disclosure describe generating an interference metric that takes into account temporal variations and/or spatial variations in interference. A UE thus transmits a more reliable interference metric to the base station than an interference metric measured at a single time instance and at a single antenna of the UE. In this manner, MCS selections, transmission scheduling, rate selections, or other decisions that may be made by the base station based on the more reliable interference metric received from the UE may be improved. For example, the interference metric determination and reporting as described herein may compensate for interference caused by dynamic TDD or beamforming in 5G/NR communications. As a result, an interference caused by dynamic TDD or beamforming may not unduly impact MCS, transmission scheduling, or other decisions made by a base station based on an interference metric reported by a UE.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method performed by an apparatus of a user equipment (UE), comprising:
   receiving a radio resource control (RRC) configuration message indicating a type of an overall interference metric to be generated and reported by the UE;
   measuring, during a first time window, a first interference metric at a first antenna of the UE for wireless signals transmitted by a base station;
   measuring, during a second time window, a second interference metric at a second antenna of the UE for the wireless signals transmitted by the base station, a length of at least one of the first time window or the second time window being based on a periodicity for reporting the overall interference metric;
   generating a first temporal interference metric that is associated with temporal variations in interference at the first antenna based on the first interference metric;
   generating a second temporal interference metric that is associated with temporal variations in interference at the second antenna based on the second interference metric;
   calculating a distance between the first temporal interference metric and the second temporal interference metric based on the type of the overall interference metric;
   generating the overall interference metric based at least in part on the distance between the first temporal interference metric and the second temporal interference metric, the overall interference metric indicating that a level of interference is higher at the first antenna, and the overall interference metric being associated with temporal and spatial variations in interference; and
   transmitting the overall interference metric to the base station, wherein a modulation and coding scheme (MCS) index value for a subsequent communication at the first antenna is modified based at least in part on the overall interference metric indicating that the level of interference is higher at the first antenna.

2. The method of claim 1, wherein at least one of the first interference metric or the second interference metric includes one or more of:
   a channel quality indicator (CQI);
   a signal to interference plus noise ratio (SINR);
   a signal to noise ratio (SNR); or
   instantaneous channel state information (CSI).

3. The method of claim 2, wherein the RRC configuration message indicates one or more interference measurement resources (IMRs) for the UE as defined by the Third Generation Partnership Project (3GPP) set of standards, and
   wherein measuring the first interference metric and the second interference metric comprises:
      utilizing the one or more IMRs to measure the first interference metric and the second interference metric.

4. The method of claim 3, wherein at least one of the first interference metric or the second interference metric is based on a cross-link interference received signal strength indicator (CLI-RSSI) at one or more of the first antenna or the second antenna.

5. The method of claim 2, wherein measuring the first interference metric at the first antenna and measuring the second interference metric at the second antenna includes periodically measuring the first interference metric and the second interference metric, and wherein the first time window is different from the second time window.

6. The method of claim 5, wherein generating the overall interference metric further includes:
   determining a variance based at least in part on the first temporal interference metric and the second temporal interference metric.

7. The method of claim 6, wherein determining the first temporal interference metric includes averaging a group of first interference metrics measured at the first antenna during the first time window.

8. The method of claim 7, further comprising:
   receiving an indication a periodicity for measuring an interference metric, the length of the first time window being based on the periodicity for reporting the interference metric.

9. The method of claim 8, wherein the RRC configuration message is received from the base station.

10. The method of claim 6, further comprising periodically reporting the overall interference metric to the base station, wherein the periodicity for reporting the overall interference metric is based at least in part on the length of the first time window.

11. The method of claim 2, further comprising receiving one or more of a downlink control information (DCI) or a media access control control element (MAC CE) from the base station, wherein generating the overall interference metric or transmitting the overall interference metric to the base station is based on the one or more of the DCI or the MAC CE.

12. The method of claim 1, wherein a transmission scheduling for the UE is modified based on the overall interference metric.

13. The method of claim 1, further comprising:
receiving, from the base station, an indication associated with generating the overall interference metric, wherein the first interference metric is measured at the first antenna and the second interference metric is measured at the second antenna based at least in part on receiving the indication from the base station.

14. The method of claim 1, wherein the first antenna and the second antenna comprise a subset of a plurality of antennas of the UE.

15. An apparatus of a user equipment (UE) for wireless communication, comprising:
at least one modem;
at least one processor communicatively coupled with the at least one modem; and
at least one memory communicatively coupled with the at least one processor and storing processor-readable code that, when executed by the at least one processor in conjunction with the at least one modem, causes the apparatus to:
receive a radio resource control (RRC) configuration message indicating a type of an overall interference metric to be generated and reported by the UE;
measure, during a first time window, a first interference metric at a first antenna of the UE for wireless signals transmitted by a base station;
measure, during a second time window, a second interference metric at a second antenna of the UE for the wireless signals transmitted by the base station, a length of at least one of the first time window or the second time window being based on a periodicity for reporting the overall interference metric;
generate a first temporal interference metric that is associated with temporal variations in interference at the first antenna based on the first interference metric;
generate a second temporal interference metric that is associated with temporal variations in interference at the second antenna based on the second interference metric;
calculate a distance between the first temporal interference metric and the second temporal interference metric based on the type of the overall interference metric;
generate the overall interference metric based at least in part on the distance between the first temporal interference metric and the second temporal interference metric, the overall interference metric indicating that a level of interference is higher at the first antenna; and
transmit the overall interference metric to the base station, wherein a modulation and coding scheme (MCS) index value for a subsequent communication at the first antenna is modified based at least in part on the overall interference metric indicating that the level of interference is higher at the first antenna.

16. The apparatus of claim 15, wherein at least one of the first interference metric or the second interference metric includes one or more of:
a channel quality indicator (CQI);
a signal to interference plus noise ratio (SINR);
a signal to noise ratio (SNR); or
instantaneous channel state information (CSI).

17. The apparatus of claim 16, wherein the RRC configuration message indicates one or more interference measurement resources (IMRs) for the UE as defined by the Third Generation Partnership Project (3GPP) set of standards, and
wherein the processor-readable code that, when executed by the at least one processor in conjunction with the at least one modem, causes the apparatus to measure the first interference metric and the second interference metric, causes the apparatus to:
utilize the one or more IMRs to measure the first interference metric and the second interference metric.

18. The apparatus of claim 17, wherein at least one of the first interference metric or the second interference metric is based on a cross-link interference received signal strength indicator (CLI-RSSI) at one or more of the first antenna or the second antenna.

19. The apparatus of claim 16, wherein the processor-readable code that, when executed by the at least one processor in conjunction with the at least one modem, causes the apparatus to measure the first interference metric at the first antenna, further causes the apparatus to:
periodically measure the first interference metric and the second interference metric, wherein the first time window is different from the second time window.

20. The apparatus of claim 19, wherein the processor-readable code that, when executed by the at least one processor in conjunction with the at least one modem, causes the apparatus to generate the overall interference metric, further causes the apparatus to:
determine the first temporal interference metric for the first antenna based at least in part on a first group of interference metrics measured at the first antenna during the first time window and the second temporal interference metric for the second antenna based at least in part on a second group of interference metrics measured at the second antenna during the second time window; and
determine a variance based at least in part on the first temporal interference metric and the second temporal interference metric.

21. The apparatus of claim 20, wherein the processor-readable code that, when executed by the at least one processor in conjunction with the at least one modem, causes the apparatus to determine the first temporal interference metric for the first antenna, further causes the apparatus to:
average the first group of interference metrics measured at the first antenna during the first time window.

22. The apparatus of claim 20, wherein execution of the processor-readable code further causes the apparatus to:
receive an indication of a periodicity for reporting the overall interference metric; and
determine a length of the first time window based on the periodicity for reporting the overall interference metric.

23. The apparatus of claim 22, wherein the RRC configuration message is received from the base station.

24. The apparatus of claim 20, wherein execution of the processor-readable code further causes the apparatus to periodically report the overall interference metric to the base station.

25. The apparatus of claim 16, wherein execution of the processor-readable code further causes the apparatus to receive one or more of a downlink control information (DCI) or a media access control control element (MAC CE) from the base station, wherein generating the overall interference metric or transmitting the overall interference metric to the base station is based on the one or more of the DCI or the MAC CE.

26. The apparatus of claim 15, wherein a transmission scheduling for the UE is modified based on the overall interference metric.

27. The apparatus of claim 15, further comprising:
at least one transceiver coupled to the at least one modem; and
the first antenna and the second antenna coupled to the at least one transceiver to:
receive the wireless signals transmitted by the base station; and
transmit the overall interference metric to the base station.

28. The apparatus of claim 15, wherein the processor-readable code that, when executed by the at least one processor in conjunction with the at least one modem, causes the apparatus to measure the first interference metric at the first antenna and the second interference metric at the second antenna, further causes the apparatus to:
periodically measure the first interference metric the second interference metric, wherein the first time window and the second time window comprise different time windows.

29. The apparatus of claim 15, wherein the first antenna and the second antenna comprise a subset of a plurality of antennas of the apparatus.

30. A non-transitory, computer-readable medium storing instructions that, when executed by at least one processor of a user equipment (UE), cause the UE to:
receive a radio resource control (RRC) configuration message indicating a type of an overall interference metric to be generated and reported by the UE;
measure, during a first time window, a first interference metric at a first antenna of the UE for wireless signals transmitted by a base station;
measure, during a second time window, a second interference metric at a second antenna of the UE for the wireless signals transmitted by the base station, a length of at least one of the first time window or the second time window being based on a periodicity for reporting the overall interference metric;
generate a first temporal interference metric that is associated with temporal variations in interference at the first antenna based on the first interference metric;
generate a second temporal interference metric that is associated with temporal variations in interference at the second antenna based on the second interference metric;
calculate a distance between the first temporal interference metric and the second temporal interference metric based on the type of the overall interference metric;
generate the overall interference metric based at least in part on the distance between the first temporal interference metric and the second temporal interference metric, the overall interference metric indicating that a level of interference is higher at the first antenna; and
transmit the overall interference metric to the base station, wherein a modulation and coding scheme (MCS) index value for a subsequent communication at the first antenna is modified based at least in part on the overall interference metric indicating that the level of interference is higher at the first antenna.

* * * * *